United States Patent [19]

Kimura

[11] Patent Number: 5,754,749
[45] Date of Patent: May 19, 1998

[54] IMAGE PROCESSING DEVICE WITH MEANS FOR PROCESSING MULTIPLE FORMS OF IMAGE DATA

[75] Inventor: Kenji Kimura, Osaka, Japan

[73] Assignee: Mita Industrial Co., Ltd., Osaka, Japan

[21] Appl. No.: 734,536

[22] Filed: Oct. 21, 1996

[30] Foreign Application Priority Data

Sep. 13, 1996 [JP] Japan ................. 8-243205

[51] Int. Cl.⁶ .............................................. G06K 15/00
[52] U.S. Cl. ............................... 395/117; 395/101
[58] Field of Search ............................ 395/101, 106, 395/109, 110, 112, 115, 116, 117, 777, 778, 779, 782, 135, 523; 358/450, 467, 462; 382/284, 291, 292, 283, 282

[56] References Cited

U.S. PATENT DOCUMENTS

| | | | |
|---|---|---|---|
| 4,668,995 | 5/1987 | Chen et al. | 358/282 |
| 4,949,188 | 8/1990 | Suto | 358/448 |
| 5,315,691 | 5/1994 | Sumiya et al. | 395/109 |

*Primary Examiner*—Arthur G. Evans
*Attorney, Agent, or Firm*—Shinjyu Office of Patent Attorneys Osaka, Japan

[57] ABSTRACT

A reprographic device is disclosed in which the read timing of three data bit streams can be synchronized with each other by means of two FIFO memory units. The least significant bit of an 8-bit first image signal is replaced with a 1-bit area data, with both then stored in a first FIFO memory unit. A second image data, either 1-bit or 8-bit, is stored in a second FIFO memory unit. The data from the first FIFO memory unit and the second FIFO memory unit are then synchronously output therefrom by means of a read timing controller. After the data is output, the 1-bit area data is separated from the remaining seven bits of the first image data, and a null bit is added to these seven bits.

12 Claims, 8 Drawing Sheets

Fig. 7

| Row |  | Selector 22 | Selector 23 | Selector 24 | Selector 25 | FIFO 20 | FIFO21 |
|---|---|---|---|---|---|---|---|
| 1 | With Image Data B | C | WTC 27 | Read 0 Data | Read C From FIFO 20 | Data A + Data C | Data B |
| 2 | Without Data B | A | WTC 26 | Read LSB | Read C From FIFO 21 | Data A | Data C |

IMAGE PROCESSING DEVICE WITH MEANS FOR PROCESSING MULTIPLE FORMS OF IMAGE DATA

BACKGROUND OF THE INVENTION

1. Field of the Invention

The present invention relates to an image processing device for a reprographic system, and more particularly to an image processing device which synthesizes multiple types of image data.

2. Description of the Related art

Recent developments in the reprographic art have included the advent of the so-called multi-functional peripheral device, i.e., a digital copy machine which include items such as a facsimile device, a color printer, and a scanner. It is by now well known to include some type of processing unit in these types of devices so that the user can synthesize text and graphics from different sources onto one document. For example, 1-bit image data could be received by the facsimile device, synthesized with 8-bit image data previously scanned into the device's memory, and then printed out onto one sheet of paper.

These types of reprographic systems often include a processing device which synchronizes the delivery of the various image and page layout data to the printing device. For instance, in one reprographic system a first set of image data from a first processing unit is input into a FIFO circuit. This first image data is read from the FIFO when a clock signal from a second processing unit is sent to the FIFO, and then this first image data and a second set of image data from the second processor are sent to an "OR" gate and synthesized. Because the clock signal for the second processing unit controls the timing for both the second image data and the first image data, the timing of both sets of image data can be synchronized.

In this configuration, the first image data must be input into the FIFO before the second image data. Thus, in order to synchronize the timing of the first and second image data, the sequence in which the first and second image data will be sent from the two processors must be decided in advance. However, there are many instances in which image data will be received unexpectedly, i.e., when image data is received from a remote facsimile device or from a computer over a local area network (LAN). In these instances, the above described device cannot be readily utilized.

SUMMARY OF THE INVENTION

It is therefore an object of the present invention to provide a means of synchronizing and combining different types of image data to produce a single printed image.

In one aspect of the present invention, a reprographic device includes a select controller configured to receive 8-bit first image data, 1-bit data synchronous with the first image data, and a second image data asynchronous with respect to the first image data and the 1-bit data. The select controller has an 8-bit first FIFO memory unit, and an 8-bit second FIFO memory unit. The select controller is configured such that in response to receiving the second image data, a least significant bit of the first image data is replaced with the 1-bit data, the remaining 7 bits of the first image data and the 1-bit data being stored in the first FIFO memory unit, and the second image data being stored in the second FIFO memory unit and thereafter synthesized for image forming. Further, the select controller is also configured such that in response to receiving only the first image data and the 1-bit data, all 8-bits of the first image data is stored in the first FIFO memory unit, and the 1-bit data stored is the second FIFO memory unit and thereafter synthesized for image forming.

Preferably, the select controller also includes a read timing controller connected to the first and second FIFO memory units which synchronizes read timing.

Preferably, the select controller also includes a first write timing controller connected to the first and second FIFO memory units, wherein the first write timing controller provides write timing for the first FIFO memory unit in response to the select controller receiving the first image data, and write timing for the second FIFO memory unit in response to the select controller receiving the 1-bit data.

Preferably, the select controller also includes a second write timing controller connected to the second FIFO memory unit, wherein in response to receiving the second image data the second write timing controller provides write timing of the second image data to the second FIFO memory unit and the first write timing controller provides write timing of the first image data and the 1-bit data to the first FIFO memory unit.

Preferably, the select controller also includes a first selector connected to the first FIFO memory unit, the first selector configured to receive both the least significant bit of the first image data and the 1-bit data. In response to the select controller receiving only the first image data and the 1-bit data, the first selector transmits the least significant bit of the first image data to the first FIFO memory unit. Further, in response to the select controller receiving the second image data, the first selector transmits the 1-bit data to the first FIFO memory unit.

Preferably, the select controller also includes a second selector connected to the second FIFO memory unit and the first and second write timing controllers. In response to the select controller receiving only the first image data and the 1-bit data, the second selector transmits a write signal from the first write controller to the second FIFO memory unit. Further, in response to the select controller receiving the second image data, the second selector transmits a write signal from the second write controller to the second FIFO memory unit.

Preferably, the select controller also includes a third selector connected to the first FIFO memory unit and in response to the select controller receiving only the first image data and the 1-bit data, the third selector transmits the least significant bit of the first image data from the first FIFO memory unit. Alternatively, in response to the select controller receiving the second image data, the third selector transmits a null bit which is substituted for the least significant bit of the first image data.

Preferably, the select controller also includes a fourth selector connected to both the first and second FIFO memory units. In response to the select controller receiving only the first image data and the 1-bit data, the fourth selector transmits the 1-bit data from the second FIFO memory unit. Alternatively, in response to the select controller receiving the second image data, the fourth selector transmits the second image data from the second FIFO memory unit.

Preferably, the reprographic device also includes a central processing unit connected to the select controller, an image reader connected to the central processing unit, a printing unit, and an area distinguishing unit connected to the central processing unit. The image reader is configured to create image data. The image data is transmitted via the central processing unit to the area distinguishing unit. The area distinguishing unit is configured to process the image data to produce the first image data and the 1-bit data, the 1-bit data defining a quality of the first image data.

In another aspect of the present invention, a method of synchronizing a timing of multiple types of data using two FIFO memory units disposed in a reprographic device includes the steps of:

providing a reprographic unit with a selector for selecting the flow of data between a first FIFO memory unit and a second FIFO memory unit;

inputing first image data into the reprographic device, the first image data being in an 8-bit format;

creating 1-bit data which defines a quality of the first image data, the 1-bit data being in a 1-bit format;

setting the selector to direct a least significant bit of the first image data into a first FIFO memory unit and synchronously directing the 1-bit data into a second FIFO memory unit in response to the reprographic device only receiving the first image data and the 1-bit data;

providing a second image data in the reprographic device;

setting the selector in response to receiving the second image data to ignore the least significant bit and direct the 1-bit data to the first FIFO memory unit and direct the second image data to the second FIFO memory unit; and directing a remaining seven bits of the first image data to the first FIFO memory unit.

Preferably, the method also includes the steps of:

providing the reprographic unit with a second selector for selecting the flow of data out of the first FIFO memory unit;

setting the second selector to direct a least significant bit of the first image data from the first FIFO memory unit and synchronously directing the 1-bit data from second FIFO memory unit in response to the reprographic device only receiving the first image data and the 1-bit data; and setting the second selector in response to receiving the second image data to transmit null data in place of the least significant bit and direct the 1-bit data from the first FIFO memory unit.

Preferably, the method also includes the steps of:

providing the reprographic unit with a third selector for selecting write timing for the second FIFO memory unit;

setting the third selector in response to the reprographic device receiving only the first image data and the 1-bit data to provide the second FIFO memory unit with write timing from a first write timing controller such that both the first and second FIFO memory units receive write timing from the first write timing controller; and setting the third selector in response to the reprographic device receiving the second image data to provide the second FIFO memory unit with write timing from a second write timing controller and the first FIFO memory unit receives write timing from the first write timing controller.

In present invention, when the second image data is not present, the 1-bit data is stored in the second FIFO memory unit which is separate and distinct from the first FIFO memory unit in which the first image data is stored. When the second image data is present, a least significant bit of the first image data is replaced with the 1-bit data, the remaining 7 bits of the first image data and the 1-bit data are stored in the first FIFO memory unit, and the second image data is stored in the second FIFO memory unit.

Other objects, features, aspects and advantages of the present invention will be apparent from the following detailed description of the present invention when taken in conjunction with the accompanying drawings, in which like reference numerals designate the same or similar parts throughout.

BRIEF DESCRIPTION OF THE DRAWINGS

FIG. 7 is a table showing selector configurations for two conditions of the reprographic device of the present invention, a first condition where two separate sources of data are used to produce a printed image and a second condition where only one source of data is used to produce a printed image;

DETAILED DESCRIPTION OF THE PREFERRED EMBODIMENTS

Figure 1:
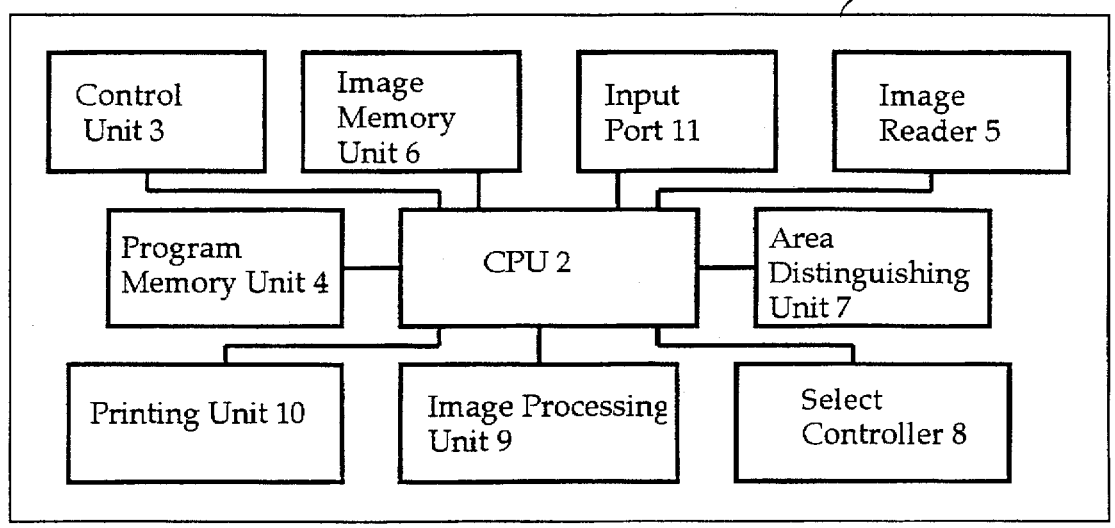
FIG. 1 is a block diagram showing a schematic representation of a reprographic device in accordance with a first embodiment of the present invention, the reprographic device having an image reader, image processing unit, an image memory unit, a select controller and a printing device.
Figure 2:
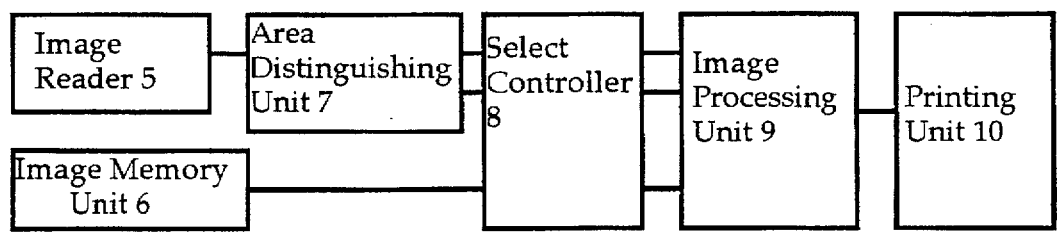
FIG. 2 is another block diagram representing the reprographic device depicted in FIG. 1 that has been simplified to show a flow of data from the image reader and image memory unit to the printing device.

FIGS. 1 and 2 show a block diagram of some of the components of a multi-functional peripheral device 1 (hereinafter referred to as a digital copy machine 1). As is shown in FIG. 1, a central processing unit (CPU) 2 is disposed within the digital copy machine 1 and includes a RAM (not shown) and a ROM (not shown). The CPU 2 is configured to control of the functions of the digital copier 1. A control unit 3, a program memory unit 4, an image reader 5, an image memory unit 6, an area distinguishing unit 7, a select controller 8, an image processing unit 9, a printing unit 10 and an input port 11 are all connected to and in electronic communication with the CPU 2.

The control unit 3 includes a control panel (not shown) for receiving user input. The program memory unit 4 includes RAM (not shown) and ROM (not shown), and is used to store necessary system software to run the digital copier 1.

The image reader 5 includes a scanner (not shown), for photoelectrically reading an image from an original document and converting the image into digital image data. The image memory unit 6 electronically stores image data received from peripheral devices such as facsimile machines, personal computers and the like which may be connected to the input port 11, or can store image data previously produced by the image reader 5. Typically user input from the control unit 3 designates whether or not image data from the image reader 5 is to be stored in the image memory unit 6.

The area distinguishing unit 7 receives the image data from the image reader 5, and distinguishes text from halftone image data scanned from the original document and produces 1-bit area data corresponding to each pixel of image data scanned in from the original document. The area data, as described below, may also be used to provide information concerning the quality of each pixel of the image scanned. For instance, if a pixel is text, the quality of the pixel may differ from that of a photograph or a dot matrix newsprint photograph. The area data designates what type of each pixel of image has been scanned.

The select controller 8 includes a plurality of FIFO memory devices and selector gates, and can synchronize and selectively output various types of image data, as well as any corresponding control signals, as is described in greater detail below. The image processing unit 9 further synthesizes the image data, and uses the area data from the area distinguishing unit 7 in order to better define any text and halftone images for printing. The printing unit 10 serves to print out the processed image data, and includes a photosensitive drum and an image developing unit. The input port 11 may be either a computer serial port or a parallel port for connection to a computer, word processor, a modem or a local area network depending upon the desired application of the present invention.

Referring now to the block diagram in FIG. 3, the select controller 8 will now be described in greater detail. The select controller 8 includes a first 8-bit FIFO memory unit 20, a second 8-bit FIFO memory unit 21, a first selector 22, a second selector 23, a third selector 24, a fourth selector 25, a first write timing controller 26, a second write timing controller 27, and a read timing controller 28.

Figure 3:
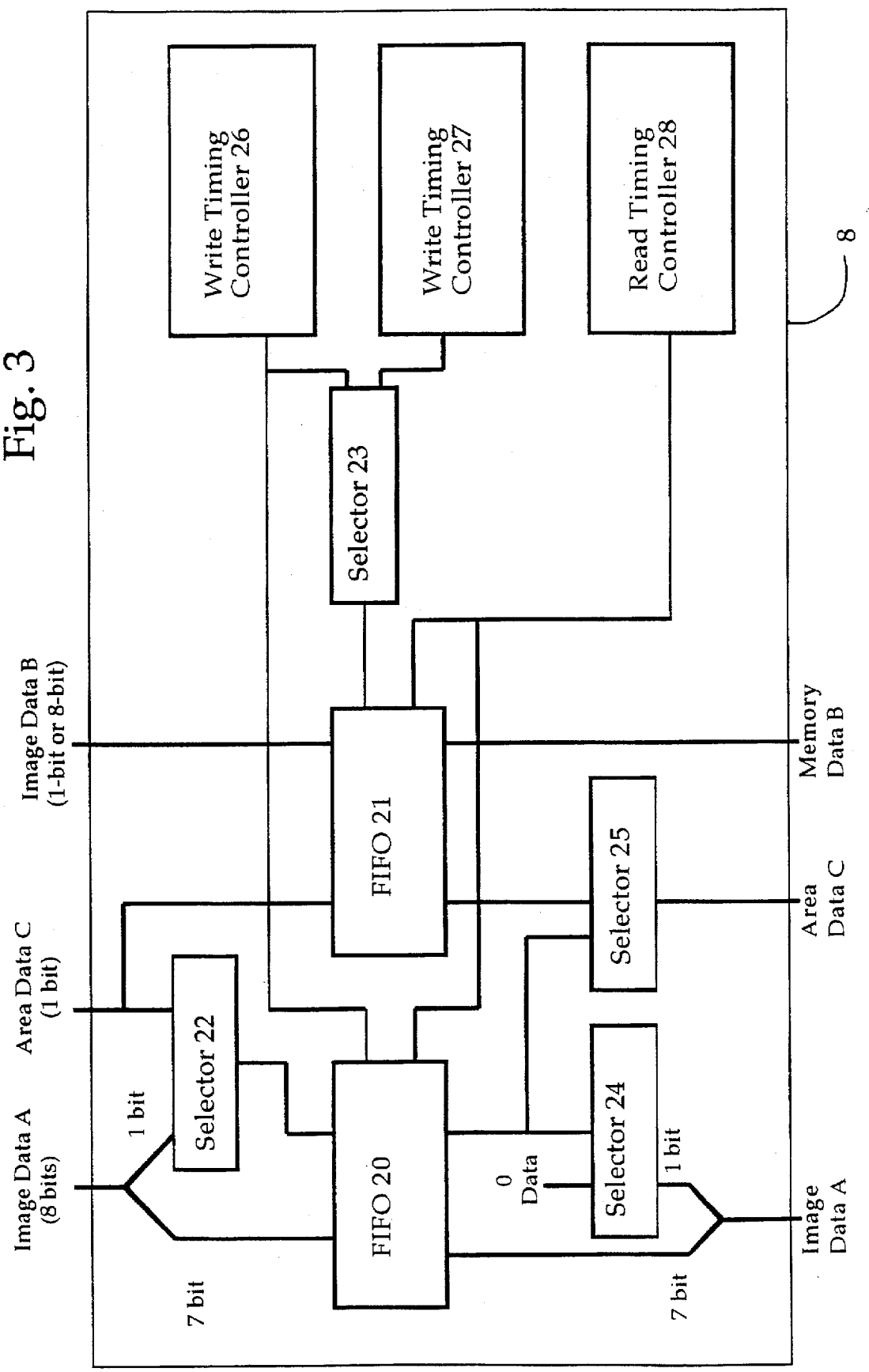
FIG. 3 is a block diagram showing the flow of data through the select controller of the reprographic device depicted in FIGS. 1 and 2.

The select controller 8 is configured to receive three types of data which will be described further below, image data A, image data B and area data C, as shown in FIG. 3. The first 8-bit FIFO memory unit 20 is configured to receive the image data A and also connected to receive data from the first selector 22. The first selector 22 is connected to the first 8-bit FIFO memory unit 20 and selectively receives either a portion of the image data A or the area data C, as is described below. The second 8-bit FIFO memory unit 21 is configured to selectively receive the image data B or to receive area data C, as is described below. The first FIFO 20 is further connected to the third selector 24, the fourth selector 25 and outputs of the select controller 8. The second FIFO 21 is further connected to the fourth selector 25 and outputs of the select controller 8.

The first write timing controller 26 is connected to the second selector 23 and to the first FIFO 20. The second write timing controller 27 is connected to the second selector 23. The read timing controller 28 connected to both the first FIFO 20 and second FIFO 21.

As is indicated in FIGS. 2 and 3, the first FIFO 20 temporarily stores 8-bit image data A which is transmitted from the area distinguishing unit 7, and the second FIFO 21 temporarily stores either 8-bit or 1-bit image data (1-bit in FIG. 3) transmitted from the image memory unit 6. A 1-bit area data C is also transmitted from the area distinguishing unit 7, and is synchronized with the image data A. This area data C is stored in either the first FIFO 20 or the second FIFO 21, as described below.

The first FIFO 20 selectively stores either the least significant bit (LSB) of the 8-bit image data A, or the 1-bit area data C, both of which are transmitted from the first selector 22. The second selector 23 supplies the second FIFO with either a write timing signal from the first write timing controller 26, or a write timing signal from the second write timing controller 27. The third selector 24 selectively outputs either the LSB of the image data A from FIFO 20 or a null bit. The fourth selector 25 selectively outputs either the LSB of the image data A from the FIFO 20, which has been substituted with the 1-bit area data C, or the 1-bit area data C from the FIFO 21. That is, the fourth selector 25 always outputs the 1-bit area data C.

Figure 5:
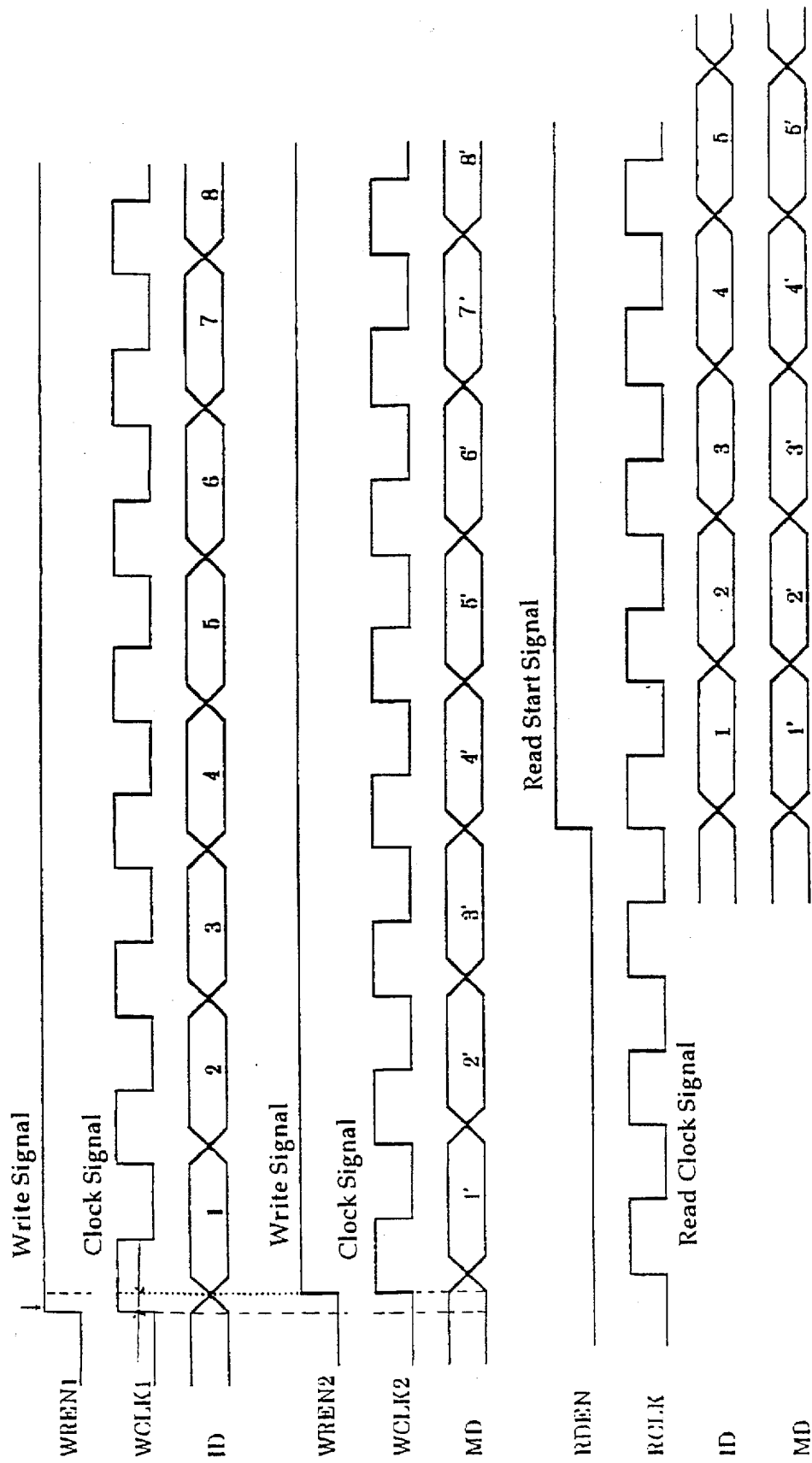
FIG. 5 is a timing chart showing the timing of data flow through the select controller depicted in FIG. 3.

The first write timing controller 26 outputs a first write control signal to both the first FIFO 20 and the second FIFO 21 in order to control the timing of data input therein. As shown in FIG. 5, the first write control signal is composed of both a write start signal WREN1 and a write clock signal WCLK1.

In addition, the second write timing controller 27 outputs a second write control signal to the second FIFO 21 in order to control the timing of data input therein. As shown in FIG. 5, the second write control signal is composed of both a write start signal WREN2 and a write clock signal WCLK2.

The read timing controller 28 controls the timing of the data output from both the first FIFO 20 and the second FIFO 21 by means of a read control signal. As shown in FIG. 5, the read control signal is composed of both a read start signal RDEN and a read clock signal RCLK.

Figure 4:
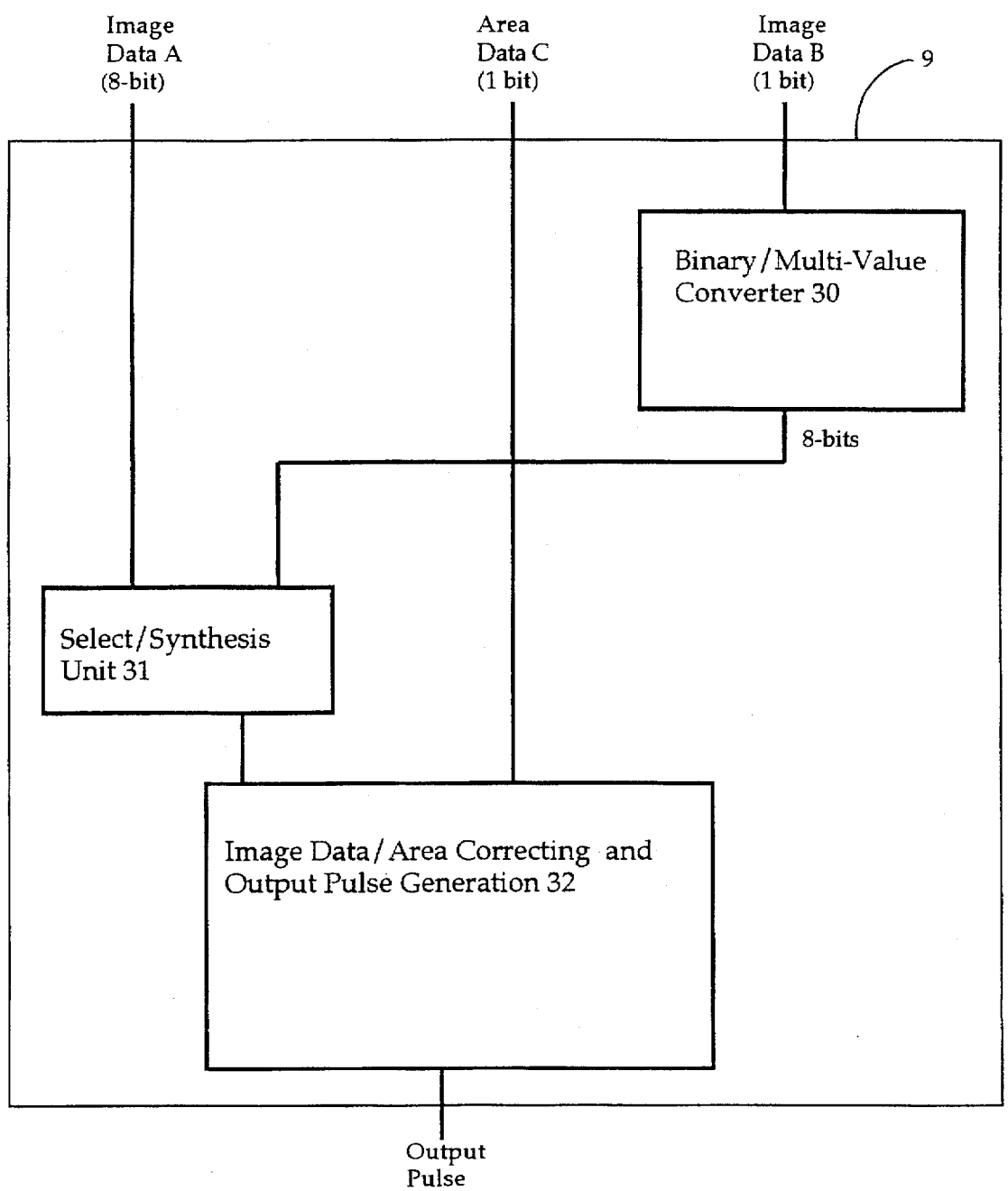
FIG. 4 is a block diagram showing the flow of data through the image processing unit of the reprographic device depicted in FIGS. 1 and 2.

Referring now to FIG. 4, the image processor 9 includes a binary/multi-value converter 30, which converts image data B to 8-bit image data (if it was originally 1-bit). The converted 8-bit image data B and the 8-bit image data A are output to and selectively synthesized in a select/synthesis unit 31. An image data correction/output pulse generation unit 32 is also included in the image processor 9. This unit receives both the image data from the select/synthesis unit 31 and the area data C, and uses the area data C to correct any text and halftone image data present in order to provide a smooth and clean image. This corrected image data is then converted to output pulses and is transmitted the printing unit 10 for printing.

The operation of this embodiment of the present invention will now be explained.

FIG. 2 shows the data flow when two groups of image data are to be synthesized in a digital copier. The scanner of image reader 5 can read the image data A into the digital copier 1, and the image data B previously stored in the image memory unit 6 can be synthesized with the image data A. The image data B may be stored in the image memory unit 6 as either 1-bit data or 8-bit data. It should be understood that the source of the image data B may be a computer (not shown), from a modem (not shown), a facsimile transmission or from a local area network (not shown), any of which being connected to the input port 11. In one example of the present invention, the image data B represents the words "TOP SECRET", as is shown in FIG. 6.

Figure 6:
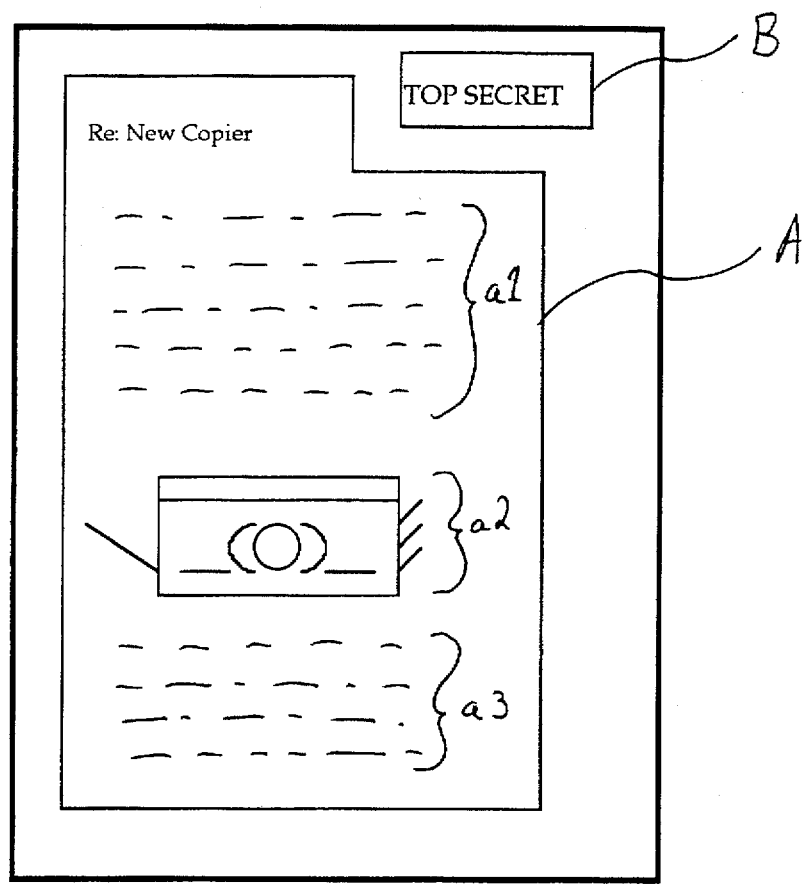
FIG. 6 is a printed document showing an example of an image produced by the present invention from two sources of image data.

In the example shown in FIG. 6, the words "TOP SECRET" were scanned previously and stored in the image memory unit 6. Based upon instructions inputed by a user using the control unit 2, the scanner of image reader 5 scans an image and produces the image data A (shown in FIG. 6).

The image data A is transmitted to the area distinguishing unit 7 as 8-bit image data. The area distinguishing unit 7 analyzes the image data and creates 1-bit area data C and the 8-bit image data A. Both the 8-bit image data A and the 1-bit area data C are synchronized and sent to the select controller 8.

The value of each 1-bit area data C corresponds to each pixel of the image data A, depending on whether each pixel is composed of text data or halftone data. For example, the image data A represents text data a1 and graphic data a2, shown in FIG. 6. For each pixel of the text data a1, each 1-bit area data C will be assigned a value of "0", but for each pixel of the halftone data a2 the 1-bit area data C will be assigned a value of "1". In addition, a 1-bit image data B can be selectively read from the image memory unit 6 and transmitted to the select controller 8.

The image data A, the image data B and the area data C are synchronized and output by the select controller 8. Next, the image data A and the image data B are synthesized by the image processing unit 9, and then printed by means of the printing unit 10. The final product can be seen in FIG. 6.

Next, the operation of the select controller 8 will be explained with reference to FIGS. 3, 5, 7 and 8.

In the case where image data A alone is processed and printed (i.e., no image data B is to be used), the selectors 22, 23, 24 and 25 are set in accordance with row 2 in FIG. 7. For instance, the first selector 22 is set to receive the LSB of the image data A, the second selector 23 is set to receive the first write control signal from the first write timing controller 26, the third selector 24 is set to receive the LSB from the 8-bit image data A output from the first FIFO 20, and the fourth selector 25 is set to receive the 1-bit area data C output from the second FIFO 21.

In this example, the first 7 bits of the image data A are input into the first FIFO 20, and the LSB is first received by first selector 22 and then input into first FIFO 20 along with the first 7 bits of each portion of the image data A. In addition, the 1-bit area data C is input into the second FIFO 21. The write timing of both the first FIFO 20 and the second FIFO 21 are controlled by the write control signal from the write timing controller 26. The image data A and the area data C which are respectively stored in the first FIFO 20 and the second FIFO 21 are synchronized and read out therefrom by means of a read control signal from the read timing controller 28. The 1-bit LSB of the image data A read out from the first FIFO 20 is first sent to the third selector 24 and then to the image processor 9, together with the remaining 7-bits of the image data A. In addition, the 1-bit area data C read out from the second FIFO 21 is sent to the fourth selector 25 and then to the image processor 9.

Figure 8:
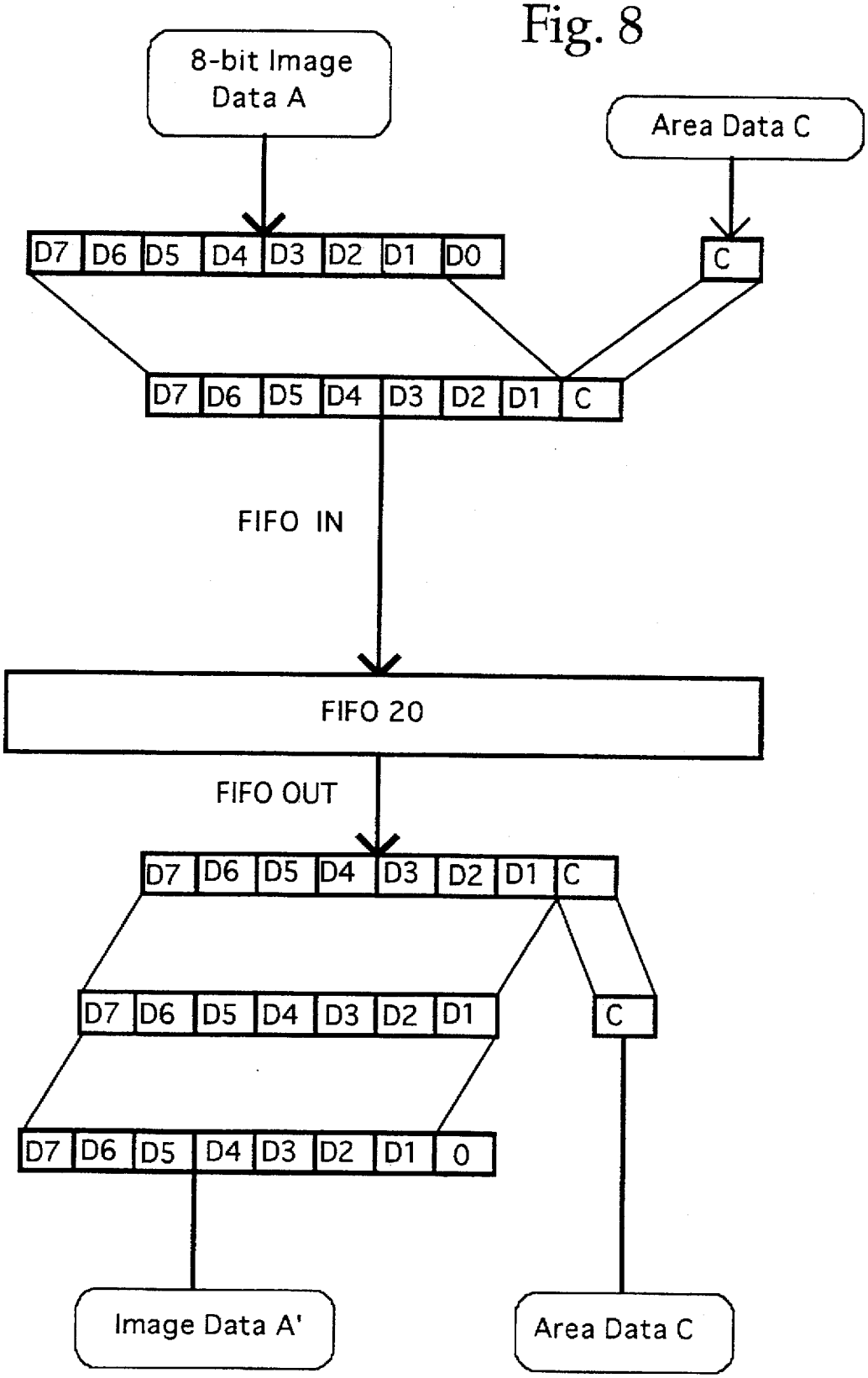
FIG. 8 is a graphical representation of 8-bit data manipulated by the reprographic device in accordance with the present invention where two sources of data are used to produce a printed image.

FIG. 8 also shows the flow of data when the image data A is to be synthesized with the image data B. Row 1 of the table in FIG. 7 shown the settings of the selectors 22, 23, 24 and 25 in the case where the image data A is to be synthesized with the image data B. In this situation, the first selector 22 is set to receive the area data C, the second selector 23 is set to receive the write control signal from the second write timing controller 27, the third selector 24 is set to receive a null ("0") bit, and the fourth selector 25 is set to receive the area data C read out from the first FIFO 20.

Here, the image data A will be written into the first FIFO 20 by means of the write control signal (WREN1 and WCLK1 in FIG. 5) sent from the first write timing controller 26. As shown in FIG. 8, the 7 bits D1–D7 of the image data A are written into the first FIFO 20, but the LSB D0 is replaced with the 1-bit area data C by the first selector 22 and is then written into the first FIFO 20. The image data A and the area data C are synchronized with each other here.

The image data B from the image memory unit 6 is written into the second FIFO 21 by means of the write control signal (WREN2 and WCLK2 in FIG. 5) from the second write timing controller 27. However, as is shown in FIG. 5, image data A and area data C are timed differently than the image data B. Consequently, the same FIFO cannot be used for both groups of data. Thus, the image data A and the area data C are read into the first FIFO 20, and the image data B is read into the second FIFO 21.

When data is read out of the first FIFO 20 and the second FIFO 21, a read control signal (RDEN and RCLK in FIG. 5) from the read timing controller 28 will be sent to both the first FIFO 20 and the second FIFO 21. Both sets of data which are read out of the first FIFO 20 and the second FIFO 21 are synchronized with each other by means of this single read control signal.

As shown in FIG. 8, the 7 bits D1–D7 of the image data A are read out of the first FIFO 20 and sent directly to the image processor 9, but the LSB (area data C) is first sent to the fourth selector 25 and then sent to the image processor 9. In order to replace the LSB, a null ("0") bit is sent to the third selector 24, which then becomes LSB D0 of the image data A.

In addition, the image data B is sent to the image processor 9 directly from the second FIFO 21.

As shown above, the image data A, the area data C and the image data B can be synchronized with each other by virtue of the present invention. Typically, FIFO memory units are produced which accommodate only 8-bit data. Therefore, when the 8-bit image data A, asynchronous 1-bit image data B and the 1-bit area data C are to be synchronized, an 8-bit FIFO is needed to store each set of data. Accordingly, three 8-bit FIFO units are required. However, as shown in the present embodiment, both the 8-bit image data A and the 1-bit area data C can be synchronized with each other and stored in one FIFO because the LSB of the image data A is replaced with the 1-bit area data C. Because of this, the image data A, the area data C, and the image data B can be synchronized with each other using two FIFO units.

Figure 9:
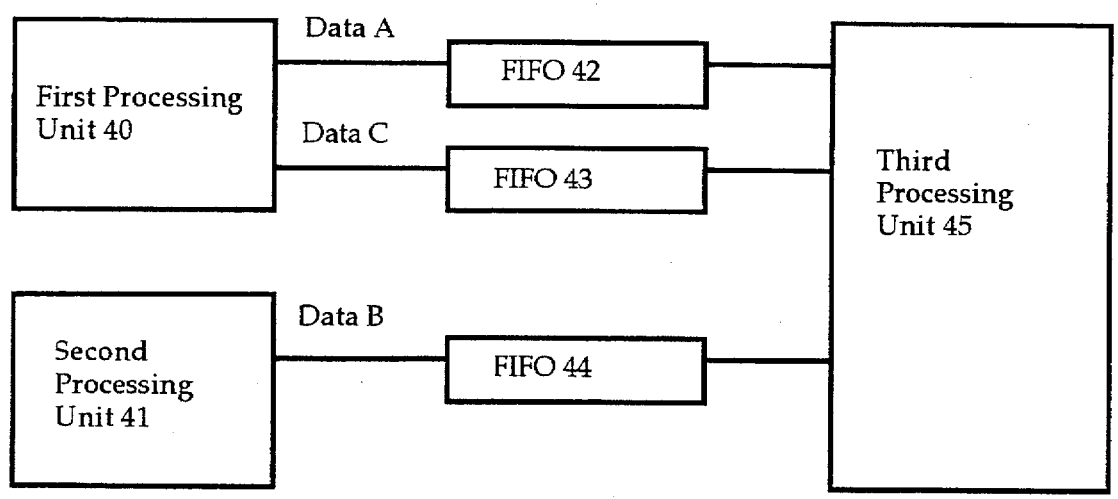
FIG. 9 is a schematic drawing of a second embodiment of a reprographic device in accordance with the present invention.

In a second embodiment of the invention, shown in FIG. 9, the image data A, the area data C, and the image data B can be synchronized with each other by using three FIFO units.

In this embodiment, both the image data A and the area data C are output from a first processing unit 40. The first processing unit 40 is generally equivalent to the image reader 5 and the area distinguishing unit 7 of the first embodiment. In addition, the image data B is output from a second processing unit 41. This image data B is not synchronized with the image data A. The second processing unit 41 is generally equivalent to the image memory unit 6 of the first embodiment.

Here, the image data A from the first processor 40 is written to a first FIFO 42, the area data C is written to a second FIFO 43, and the image data B is written to a third FIFO 44. The write timing of each group of data is different, but the write timing of both the image data A and the area data C can be synchronized. For instance, the data written to the first FIFO 42, the second FIFO 43 and the third FIFO 44 are read out therefrom by means of a single read control signal (not shown). In this way, the data output from the first FIFO 42, the second FIFO 43, and the third FIFO 44 are synchronized with each other. Then, the synchronized data is input into a third processor 45, where image combination and processing can proceed as in the first embodiment.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

I claim:

1. A reprographic device, comprising:

a select controller configured to receive 8-bit first image data, 1-bit data synchronous with said first image data, and a second image data asynchronous with respect to said first image data and said 1-bit data;

said select controller having an 8-bit first FIFO memory unit, and an 8-bit second FIFO memory unit;

wherein said select controller is configured such that in response to receiving said second image data, a least significant bit of said first image data is replaced with said 1-bit data, the remaining 7 bits of said first image data and said 1-bit data being stored in said first FIFO memory unit, and said second image data being stored in said second FIFO memory unit and thereafter synthesized for image forming; and wherein said select controller is also configured such that in response to receiving only said first image data and said 1-bit data, all 8-bits of said first image data is stored in said first FIFO memory unit, and said 1-bit data stored is said second FIFO memory unit and thereafter synthesized for image forming.

2. The reprographic device of claim 1, wherein said select controller further comprises:

a read timing controller connected to said first and second FIFO memory units which synchronizes read timing.

3. The reprographic device of claim 1, wherein said select controller further comprises:

a first write timing controller connected to said first and second FIFO memory units, wherein said first write timing controller provides write timing for said first FIFO memory unit in response to said select controller receiving said first image data, and write timing for said second FIFO memory unit in response to said select controller receiving said 1-bit data.

4. The reprographic device of claim 3, wherein said select controller further comprises:

a second write timing controller connected to said second FIFO memory unit, wherein in response to receiving said second image data said second write timing controller provides write timing of said second image data to said second FIFO memory unit and said first write timing controller provides write timing of said first image data and said 1-bit data to said first FIFO memory unit.

5. The reprographic device of claim 4, wherein said select controller further comprises:

a first selector connected to said first FIFO memory unit, said first selector configured to receive both the least significant bit of said first image data and said 1-bit data;

wherein in response to said select controller receiving only said first image data and said 1-bit data, said first selector transmits the least significant bit of said first image data to said first FIFO memory unit; and wherein in response to said select controller receiving said second image data, said first selector transmits said 1-bit data to said first FIFO memory unit.

6. The reprographic device of claim 5, wherein said select controller further comprises:

a second selector connected to said second FIFO memory unit and said first and second write timing controllers;

wherein in response to said select controller receiving only said first image data and said 1-bit data, said second selector transmits a write signal from said first write controller to said second FIFO memory unit; and wherein in response to said select controller receiving said second image data, said second selector transmits a write signal from said second write controller to said second FIFO memory unit.

7. The reprographic device of claim 6, wherein said select controller further comprises:

a third selector connected to said first FIFO memory unit;

wherein in response to said select controller receiving only said first image data and said 1-bit data, said third selector transmits the least significant bit of said first image data from said first FIFO memory unit; and wherein in response to said select controller receiving said second image data, said third selector transmits a null bit which is substituted for the least significant bit of said first image data.

8. The reprographic device of claim 1, wherein said select controller further comprises:

a fourth selector connected to both said first and second FIFO memory units;

wherein in response to said select controller receiving only said first image data and said 1-bit data, said fourth selector transmits said 1-bit data from said second FIFO memory unit; and wherein in response to said select controller receiving said second image data, said fourth selector transmits said 1-bit data from said first FIFO memory unit.

9. The reprographic device of claim 1, further comprising:

a central processing unit connected to said select controller;

an image reader connected to said central processing unit;

a printing unit; and an area distinguishing unit connected to said central processing unit;

wherein said image reader is configured to create image data, said image data transmitted via said central processing unit to said area distinguishing unit, said area distinguishing unit being configured to process said image data to produce said first image data and said 1-bit data, said 1-bit data defining a quality of said first image data.

10. A method of synchronizing a timing of multiple types of data using two FIFO memory units disposed in a reprographic device, the method comprising the steps of:

providing a reprographic unit with a selector for selecting the flow of data between a first FIFO memory unit and a second FIFO memory unit;

inputing first image data into the reprographic device, the first image data being in an 8-bit format;

creating 1-bit data which defines a quality of the first image data, the 1-bit data being in a 1-bit format;

setting the selector to direct a least significant bit of the first image data into a first FIFO memory unit and synchronously directing the 1-bit data into a second FIFO memory unit in response to the reprographic device only receiving the first image data and the 1-bit data;

providing a second image data in the reprographic device;

setting the selector in response to receiving the second image data to ignore the least significant bit and direct the 1-bit data to the first FIFO memory unit and direct the second image data to the second FIFO memory unit; and directing a remaining seven bits of said first image data to said first FIFO memory unit.

11. The method of synchronizing a timing of multiple types of data as set forth in claim 10, further comprising the steps of:

providing the reprographic unit with a second selector for selecting the flow of data out of the first FIFO memory unit;

setting the second selector to direct a least significant bit of the first image data from the first FIFO memory unit and synchronously directing the 1-bit data from second FIFO memory unit in response to the reprographic device only receiving the first image data and the 1-bit data; and setting the second selector in response to receiving the second image data to transmit null data in place of the least significant bit and direct the 1-bit data from the first FIFO memory unit.

12. The method of synchronizing a timing of multiple types of data as set forth in claim 11, further comprising the steps of:

providing the reprographic unit with a third selector for selecting write timing for the second FIFO memory unit;

setting the third selector in response to the reprographic device receiving only the first image data and the 1-bit data to provide the second FIFO memory unit with write timing from a first write timing controller such that both the first and second FIFO memory units receive write timing from the first write timing controller; and setting the third selector in response to the reprographic device receiving the second image data to provide the second FIFO memory unit with write timing from a second write timing controller and the first FIFO memory unit receives write timing from the first write timing controller.

* * * * *